United States Patent
Tholen et al.

(10) Patent No.: US 8,061,978 B2
(45) Date of Patent: Nov. 22, 2011

(54) SYSTEMS AND METHODS INVOLVING ABRADABLE AIR SEALS

(75) Inventors: Susan M. Tholen, Kennebunk, ME (US); Christopher W. Strock, Kennebunk, ME (US)

(73) Assignee: United Technologies Corp., Hartford, CT (US)

( * ) Notice: Subject to any disclaimer, the term of this patent is extended or adjusted under 35 U.S.C. 154(b) by 1071 days.

(21) Appl. No.: 11/872,877

(22) Filed: Oct. 16, 2007

(65) Prior Publication Data

US 2009/0097970 A1    Apr. 16, 2009

(51) Int. Cl.
*F01D 11/12*    (2006.01)

(52) U.S. Cl. ............. 415/173.1; 415/173.4; 415/174.4

(58) Field of Classification Search ............. 415/173.1, 415/173.4, 174.4, 220
See application file for complete search history.

(56) References Cited

U.S. PATENT DOCUMENTS

| | | | |
|---|---|---|---|
| 4,269,903 A | 5/1981 | Clingman et al. | |
| 4,291,089 A | 9/1981 | Adamovic | |
| 4,299,865 A | 11/1981 | Clingman et al. | |
| 4,374,173 A | 2/1983 | Adamovic | |
| 4,466,772 A | 8/1984 | Okapuu et al. | |
| 4,861,618 A | 8/1989 | Vine et al. | |
| 4,936,745 A | 6/1990 | Vine et al. | |
| 5,705,231 A | 1/1998 | Nissley et al. | |
| 5,780,171 A | 7/1998 | Nissley et al. | |
| 5,976,695 A | 11/1999 | Hajmrle et al. | |
| 6,203,021 B1 | 3/2001 | Wolfla et al. | |
| 6,358,002 B1 | 3/2002 | Good et al. | |
| 6,365,236 B1 | 4/2002 | Maloney | |
| 6,830,428 B2 * | 12/2004 | Le Biez et al. ............. | 415/173.4 |
| 6,899,339 B2 | 5/2005 | Sanders et al. | |
| 7,001,145 B2 | 2/2006 | Couture et al. | |
| 7,294,413 B2 * | 11/2007 | Nagaraj et al. ............. | 428/680 |
| 7,510,370 B2 * | 3/2009 | Strangman et al. ......... | 415/173.4 |
| 7,686,570 B2 * | 3/2010 | Allen ............................ | 415/9 |
| 2001/0048876 A1 | 12/2001 | Humhauser | |
| 2003/0175116 A1 | 9/2003 | Le Biez et al. | |
| 2006/0110247 A1 | 5/2006 | Nelson et al. | |
| 2007/0086887 A1 | 4/2007 | Pezzetti, Jr. et al. | |

* cited by examiner

*Primary Examiner* — Ninh H Nguyen

(57) ABSTRACT

Systems and methods involving air seals are provided. In this regard, a representative air seal for a gas turbine engine comprises a layer of ceramic exhibiting patterned surface features, wherein a substrate supporting the layer of ceramic lacks the patterned surface features.

17 Claims, 2 Drawing Sheets

SYSTEMS AND METHODS INVOLVING ABRADABLE AIR SEALS

BACKGROUND

1. Technical Field

The disclosure generally relates to gas turbine engines.

2. Description of the Related Art

Air seals are formed between various components of gas turbine engines, such as between rotating turbine blades and the inner surface of a turbine casing. In this regard, some air seals are provided as an abradable air seal that incorporates an abradable material affixed to the inner surface of the casing. The abradable material is contacted and thus abraded by the rotating blade tips of the turbine blades during operation.

Other air seals are provided as wear resistant seals. Wear resistant seals also employ materials affixed to the inner surface of the casing. Such materials, however, are selected for oxidation resistance and/or thermal protection, for example.

Selection of materials for forming such an air seal typically involves a compromise between resistance to wear by erosion, abradability by blade tips, spallation resistance and environment durability. Notably, materials with higher abradability tend to suffer from excess erosion, while less abradable materials tend to be susceptible to spallation.

SUMMARY

Systems and methods involving air seals are provided. In this regard, an exemplary embodiment of an air seal for a gas turbine engine comprises a layer of ceramic exhibiting patterned surface features, wherein a substrate supporting the layer of ceramic lacks the patterned surface features.

An exemplary embodiment of a gas turbine engine comprises a casing having an interior surface and a layer of ceramic exhibiting patterned surface features, the layer of ceramic being fixed in position relative to the interior surface; and a turbine mounted at least partially within the casing, the turbine having rotatable blades, the blades being operative to abrade the layer of ceramic such that an abradable air seal is provided between the interior of the casing and the blades. An exemplary embodiment of a method for forming an air seal for a gas turbine engine comprises forming a patterned layer of ceramic, wherein a substrate supporting the layer of ceramic lacks the pattern exhibited by the layer.

An exemplary embodiment of a method for forming an air seal for a gas turbine engine comprises: forming a patterned layer of ceramic, wherein a substrate supporting the layer of ceramic lacks the pattern exhibited by the layer.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

DETAILED DESCRIPTION

Systems and methods involving air seals are provided, several exemplary embodiments of which will be described in detail. In this regard, some embodiments involve the use of multiple layers of ceramic with each of the layers being selected to provide particular performance characteristics. By way of example, an outer ceramic layer can be selected to provide sufficient abradability, while an inner ceramic layer can be selected for spallation and erosion resistance.

Figure 1:
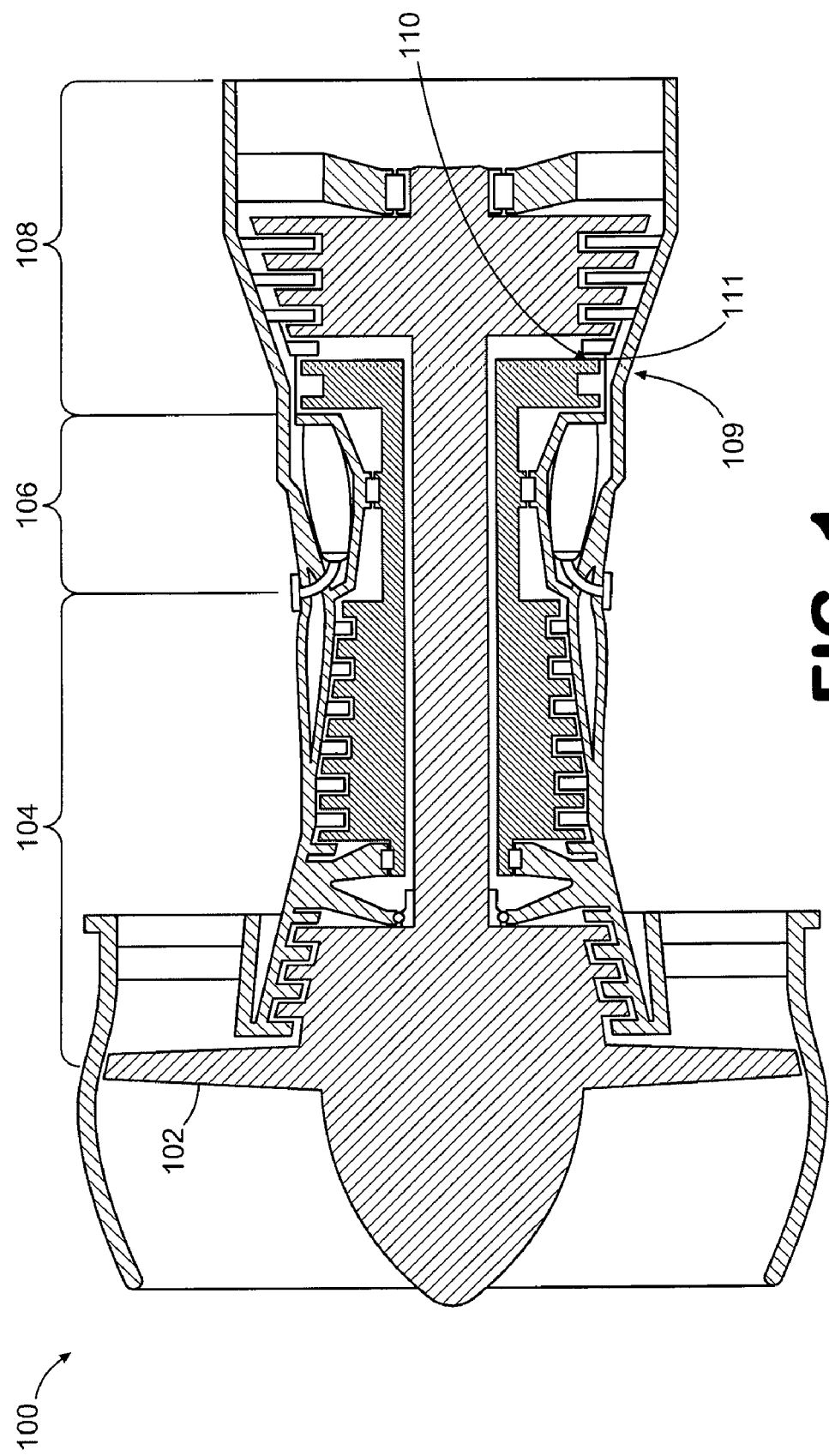
FIG. 1 is a schematic diagram depicting an exemplary embodiment of a gas turbine engine.

In this regard, FIG. 1 is a schematic diagram depicting an exemplary embodiment of a gas turbine engine. As shown in FIG. 1, engine 100 is configured as a turbofan that incorporates a fan 102, a compressor section 104, a combustion section 106, and a turbine section 108. Notably, the turbine section is defined, at least in part by a turbine casing 109, which forms a portion of the casing of the engine. An air seal 110 (e.g., an abradable air seal) is formed between an inner surface of the turbine casing and a rotating blade (e.g., blade 111) of the turbine. The air seal 110 is described in greater detail with respect to FIG. 2.

Figure 2:
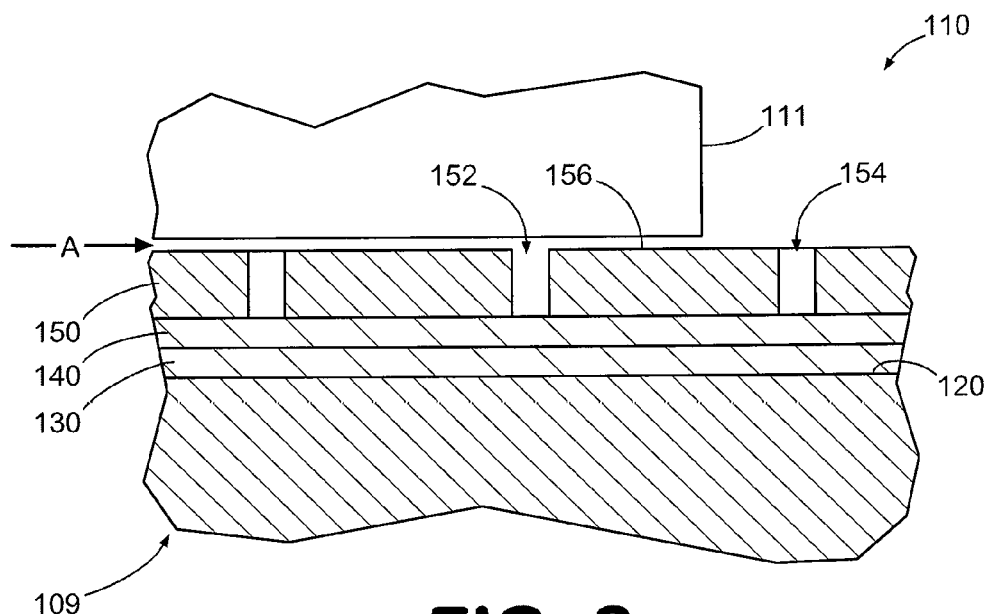
FIG. 2 is a schematic diagram depicting a portion of a representative blade tip in proximity to the casing of FIG. 1, showing detail of the air seal formed therebetween.

As shown in FIG. 2, air seal 110 is located between the rotating blades of the turbine (a portion of one of which is depicted in FIG. 2) and an inner surface 120 of turbine casing 109. In this embodiment, several layers of material are applied to the inner surface of the casing. These layers include a metallic bond coat 130, an inner ceramic layer 140 (which exhibits durable spallation and erosion resistance), and an outer ceramic layer 150 (which exhibits desired abradability characteristics).

With respect to the outer ceramic layer 150, this layer incorporates surface features that are not exhibited by the inner surface of the casing. That is, in contrast to prior art casings that incorporate various patterns of grooves and/or ridges, the inner surface 120 of the casing is relatively smooth with the patterning being exhibited by one or more of the ceramic layers. In the embodiment of FIG. 2, the patterning is restricted to the outer ceramic layer and includes a series of grooves (e.g., grooves 152, 154) that define ridges (e.g., ridge 156) therebetween.

The ridges in the outer layer typically reach the highest temperatures experienced by the air seal. Base metal cooling can be used to remove heat from the components. While this should cool the interface between metal and ceramic, due to the reduced thermal conductivity of the ceramic, the outer surface of the ceramic layer could remain quite warm in this case. The outer ceramic layer that forms the ridges should be resistant to the thermal environment and be able to survive the increased temperatures caused by the geometry. In many retrofit applications, gas path temperatures are low enough to use conventional porous stabilized zirconia coatings such that the ceramic surface temperature will not exceed about 2500-2600° F. (about 1371-1427° C.), for example. In other applications with higher gas path temperatures, other materials such as sintering resistant ceramic materials can be used. These may include sintering resistant compositions, such as Hf based oxides and both sintering resistant and sintering tolerant ceramic structures.

The outer layer should also be sufficiently resistant to erosion so that the outer layer retains its form. In embodiments configured as abradable air seals, the outer layer should be sufficiently abradable so that the ridges survive a rub interaction with the blades if the engine is designed to have rub interactions.

With respect to the inner ceramic layer 140, this layer can be a relatively thin, e.g., about 0.005 to about 0.015 inch (about 0.127 mm to about 0.381 mm) durable spall and erosion resistant base layer. Typical materials that can be used include chemically compatible ceramic coating compositions used for thermal barrier and wear resistant applications. These include materials applied by plasma spray (such as PWA265 and PWA36304), as well as those applied by other techniques, such as EBPVD and CVD, for example. By separating the functions of the two layers, putting grooves into the outer layer becomes feasible while still retaining the other desirable characteristics of a ceramic or ceramic-coated seal.

Notably, in some embodiments, the same material can be used for more than one of the layers. This is because different material properties can be provided by use of different thermal spray parameters and/or application techniques. Notably, a ceramic pre-form can be used for one or more of the layers.

With respect to the metallic bond coating, various materials (such as those comprising MCrAlY, for example) can be used in order to promote adherence of the inner ceramic layer to the casing. The bond coat generally has good adhesion to the base metal with tensile bond strengths in excess of the cohesive strength of the ceramic layers, and is typically in the range of 3500 psi to 10,000 psi and higher. Adhesion of the first ceramic layer is promoted by the increased roughness exhibited by the sprayed bond coat surface. This roughness is typically in the 200-650 micro inch Ra range.

With respect to the patterned surface features (e.g., grooves and ridges) exhibited by the outer ceramic layer, such features can be oriented substantially parallel to the direction of gas leakage flow over the blade tips and perpendicular to the gas path flow direction (indicated by arrow A). Such patterns have been shown to improve turbine efficiency. Theoretically, the leakage flow velocity across the features varies with axial position, thus interrupting the formation of a tip leakage vortex by tip leakage flow roll-up, and increasing the pressure ratio across the airfoils. This can be accounted for by a reduced interaction of the tip leakage vortex with the gas flow paths over the airfoil.

Other characteristics of the grooved features include the angle of the groove side walls and the matching of grooves between one segmented part and the next. Although patterned surface features have been described in the embodiment of FIG. 2 as incorporating ridges, patterns are not limited to the use of ridges (and associated grooves). By way of example, bumps and/or divots can be used.

In some embodiments, groove orientation and width is such that the blade tip intersects two or more ridge/groove pairs, and the ridges and grooves cover at least about 25% of the blade tip path. Grooves may be angled to the direction of leakage across the blade tip, as the leakage direction varies with position along the length of the tip. The angle, number, width and depth are set to provide the desired effect for the operating condition, tip clearances and geometries. These can be simple circumferential grooves, helical grooves, and groove patterns angled at up to 90 degrees from the leakage direction. The width, angle and number of the grooves may vary with engine axial position to maintain alignment with the tip leakage direction.

Figure 3:
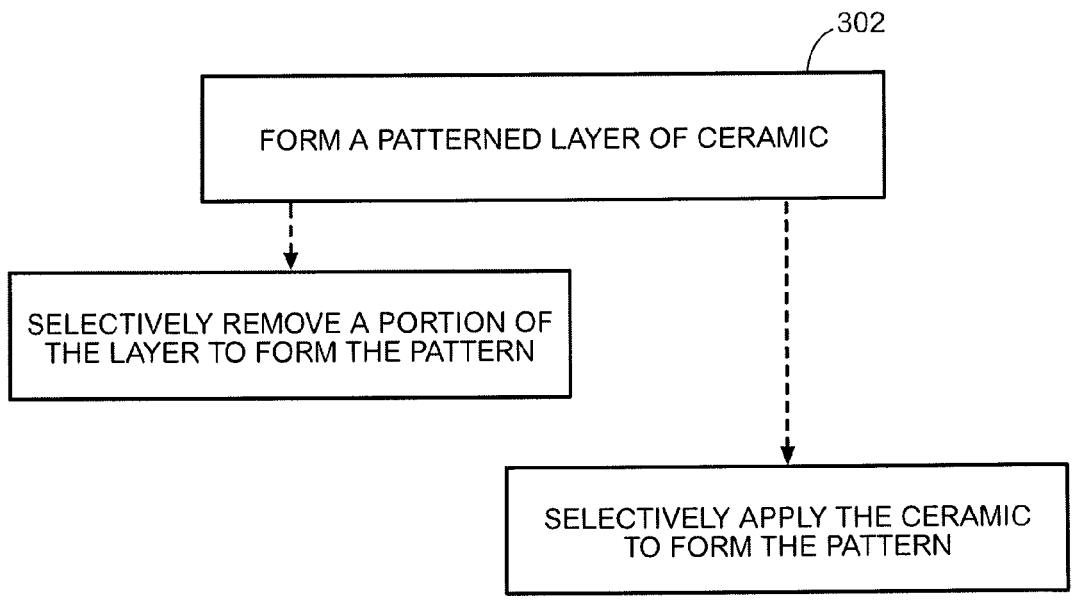
FIG. 3 is a flowchart depicting an exemplary embodiment of a method for forming an air seal.

An embodiment of a method for forming an air seal is depicted in the flowchart of FIG. 3. As shown in FIG. 3, the method involves forming a patterned layer of ceramic (block 302). Notably, the substrate used to support the layer of ceramic lacks the pattern exhibited by the layer. Thus, in some embodiments, the inner surface of a casing used for support lacks the pattern. In some embodiments, layers located intermediate the inner surface of the casing and the layer of ceramic, such as other ceramic layers, also can lack the patterning.

In this regard, patterns of surface features can either be incorporated into a coating surface (e.g., the surface of a layer of ceramic) during deposition or formed into the surface after coating. For instance, exemplary manufacturing methods include using a temporary mask that is placed over a component, e.g., a casing, prior to or during deposition. The mask is then removed, leaving the inverse pattern of the mask in the coating. Notably, masking methods may include shadow masking with a form held at or near the coating surface during at least a portion of the deposition process. The form may be an array of wires stretched over the component or a prefabricated durable or disposable template. Additionally or alternatively, thin strips of tape, polymer or other material can be adhesively bonded to the component or partially deposited coating, preventing an adherence of coating in these areas.

Alternatively, after coating, excess material may be removed by grinding, water jet, laser cutting or grit blasting, for example.

Alternatively, directly depositing a coating can be performed to a desired thickness distribution using a highly focused deposition pattern. Such a deposition pattern can be achieved using a narrow particle size distribution and appropriate spray parameters by a micro-plasma spray torch, by laser fusing, or by stereo lithography methods, for example.

Alternatively, patterns of surface features can be machined into a coating surface. These methods may include, but are not limited to, grinding, erosive processing such as grit blast, abrasive water jet, extrude hone, laser engraving and etching, for example.

Alternatively, ceramic parts and ceramic layers connected to metallic parts can be used. In some embodiments, brazing of ceramic pre-forms to a surface can be performed before or after forming the grooves. In still other embodiments, a fully ceramic air seal can be sued.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. An air seal for a gas turbine engine comprising:
a first layer of ceramic exhibiting patterned surface features;
a second layer of ceramic having a higher modulus of elasticity and a higher strength than the first layer of ceramic; and
a support substrate that lacks the patterned surface features;
wherein the second layer of ceramic is disposed between the first layer of ceramic and the support substrate.

2. The air seal of claim 1, wherein:
the air seal further comprises a metallic bond coat; and
the second layer of ceramic is applied to the metallic bond coat.

3. The air seal of claim 2, wherein:
the substrate is a surface of a casing of the gas turbine engine; and the metallic bond coat is applied to the surface of the casing.

4. The air seal of claim 2, wherein the metallic bond coat comprises MCrAlY.

5. The air seal of claim 1, wherein:
the second layer of ceramic is an abradable layer.

6. The air seal of claim 1, wherein patterned surface features are grooves.

7. The air seal of claim 6, wherein the grooves extend at least partially through the first layer of ceramic.

8. The abradable air seal of claim 6, wherein the grooves define ridges therebetween, the ridges being oriented substantially parallel to a flow direction of gas leaking by the air seal.

9. A gas turbine engine comprising:
a casing having an interior surface, a first layer of ceramic and a second layer of ceramic, which first layer of ceramic exhibits patterned surface features and is fixed in position relative to the interior surface, and which second layer of ceramic has a higher modulus of elasticity and a higher strength than the first layer of ceramic and is configured between the first layer of ceramic and the interior surface; and
a turbine mounted at least partially within the casing, the turbine having rotatable blades, the blades being operative to abrade the first layer of ceramic such that an abradable air seal is provided between the interior of the casing and the blades.

10. The engine of claim 9, wherein the casing is a turbine casing.

11. The engine of claim 9, wherein the engine is a turbofan.

12. The engine of claim 9, wherein the second layer lacks the patterned surface features.

13. The engine of claim 9, wherein the patterned surface features are grooves extending at least partially through the first layer.

14. The engine of claim 9, wherein the first layer is thicker than the second layer.

15. A method for forming an air seal for a gas turbine engine, said method comprising:
providing a casing for the gas turbine engine having an interior surface;
forming an inner layer of ceramic; and
forming an outer layer of ceramic having patterned surface features;
wherein the inner layer of ceramic lacks the patterned surface features exhibited by the outer layer of ceramic, and has a higher modulus of elasticity and a higher strength than the outer layer of ceramic; and
wherein the inner layer of ceramic is disposed between the outer layer of ceramic and the interior surface of the casing.

16. The method of claim 15, wherein the forming of the outer layer of ceramic comprises selectively removing a portion of the outer layer of ceramic to form the patterned surface features.

17. The method of claim 15, wherein the forming of the outer layer of ceramic comprises selectively applying the ceramic to form the patterned surface features.

\* \* \* \* \*